United States Patent
Rahman

[19]

[11] Patent Number: 6,078,817
[45] Date of Patent: Jun. 20, 2000

[54] SYSTEM AND METHOD OF DYNAMICALLY INCREASING THE CAPACITY OF A CODE DIVISION MULTIPLE ACCESS RADIO TELECOMMUNICATIONS NETWORK

[75] Inventor: Mohamed Anisur Rahman, Randolph, N.J.

[73] Assignee: Telefonaktiebolaget LM Ericsson, Stockholm, Sweden

[21] Appl. No.: 08/839,235

[22] Filed: Apr. 24, 1997

[51] Int. Cl.[7] ........................................ H04Q 7/20
[52] U.S. Cl. .................. 455/452; 455/509; 455/442; 370/335; 370/441
[58] Field of Search .................. 455/442, 450, 455/451, 452, 453, 8, 9, 509, 510, 512, 67.1, 422, 445, 62, 63; 370/441, 331, 335, 342

[56] References Cited

U.S. PATENT DOCUMENTS

| | | | |
|---|---|---|---|
| 4,204,093 | 5/1980 | Yeh | 370/95 |
| 4,638,476 | 1/1987 | Acampora et al. | 370/83 |
| 4,771,448 | 9/1988 | Koohgoli et al. | 455/452 |
| 4,788,679 | 11/1988 | Kataoka et al. | 370/60 |
| 5,101,501 | 3/1992 | Gilhousen et al. | 455/33 |
| 5,109,390 | 4/1992 | Gilhousen et al. | 375/1 |
| 5,265,119 | 11/1993 | Gilhouosen et al. | 375/1 |
| 5,267,261 | 11/1993 | Blakeney, II et al. | 375/1 |
| 5,278,827 | 1/1994 | Pound | 370/84 |
| 5,278,892 | 1/1994 | Bolliger et al. | 379/60 |
| 5,329,635 | 7/1994 | Wadin et al. | 455/33.2 |
| 5,341,396 | 8/1994 | Higgins et al. | 375/1 |
| 5,375,140 | 12/1994 | Bustamante et al. | 375/1 |
| 5,416,797 | 5/1995 | Gilhousen et al. | 375/705 |
| 5,432,842 | 7/1995 | Kinoshita et al. | 379/60 |
| 5,442,625 | 8/1995 | Gitlin et al. | 370/18 |
| 5,446,756 | 8/1995 | Mallinckrodt | 375/200 |
| 5,485,486 | 1/1996 | Gilhousen et al. | 375/205 |
| 5,586,170 | 12/1996 | Lea . | |
| 5,796,722 | 8/1998 | Kotzin et al. | 455/453 |
| 5,933,777 | 8/1999 | Rahman | 455/450 |

FOREIGN PATENT DOCUMENTS

| | | |
|---|---|---|
| 0 600 173 A2 | 6/1984 | European Pat. Off. . |
| 0 680 159 A2 | 11/1995 | European Pat. Off. . |
| WO 95/35637 | 12/1995 | WIPO . |
| WO 97/16931 | 5/1997 | WIPO . |

*Primary Examiner*—Reinhard J. Eisenzopf
*Assistant Examiner*—Lester G. Kincaid
*Attorney, Agent, or Firm*—Smith & Danamraj, P.C.

[57] ABSTRACT

A method and system for dynamically increasing the capacity of a code division multiple access (CDMA) radio telecommunications network. The method begins by the radio telecommunications network receiving a request for access to the radio telecommunications network from an entering mobile station. Next, a load capacity monitor determines if the radio telecommunications network is fully loaded. When the radio telecommunications network is fully loaded, a network load processor releases one of a duplicate channel element (transceiver) used in the CDMA radio telecommunications network by one of the operating mobile stations. The network load processor then assigns the released channel element to the entering mobile station. The system includes a load capacity monitor to determine whether the radio telecommunications network is fully loaded. The system also includes a network load processor to reallocate duplicate channel elements from the operating mobile stations to the entering mobile station.

20 Claims, 5 Drawing Sheets

SYSTEM AND METHOD OF DYNAMICALLY INCREASING THE CAPACITY OF A CODE DIVISION MULTIPLE ACCESS RADIO TELECOMMUNICATIONS NETWORK

BACKGROUND OF THE INVENTION

1. Technical Field of the Invention

This invention relates to radio telecommunication systems and, more particularly, to a system and method for dynamically increasing the capacity of a code division multiple access (CDMA) radio telecommunications network.

2. Description of Related Art

In radio telecommunications networks, a wide variety of services such as voice, video, data, and image services are available to subscribers. In using these radio telecommunications networks, the most precious resource is the radio spectrum. To maximize the effectiveness of the networks, code division multiple access (CDMA) has been developed to facilitate communications involving a large number of system users. There are other multiple access communication system techniques, such as time division multiple access (TDMA) and frequency division multiple access (FDMA), however, the spread spectrum modulation technique of CDMA has proven to offer many advantages over the other methods.

In a CDMA system, a unique binary spreading sequence, known as a code, is assigned for each call to each user. Multiplied by the assigned code, the user's signal is spread onto a channel bandwidth wider than the user signal bandwidth. The ratio of the system channel bandwidth to the user's bandwidth is known as the "spreading gain." All active users share the same system channel bandwidth frequency spectrum at the same time. The signal of each user is separated from the other users' signals at the receiver by issuing a correlator keyed with the associated code sequence to "de-spread" the desired signal. In this manner, an increased number of simultaneous users can be served.

In addition to serving an increased number of users, the CDMA system uses a technique known as "macro-diversity" to improve the quality of the radio reception in the radio telecommunications network. The macro-diversity mode involves the use of two or more simultaneous links from two or more cells or base stations to a single mobile station in order to improve the quality or performance of the reception of the radio signal. The mobile station and base station receivers both employ a number of correlators. Receivers using parallel correlators, which are sometimes called rake receivers, allow individual path arrivals to be tracked independently, and the sum of their received signal strengths is then used to demodulate the signal. While there may be fading on each path arrival, the fading on each channel is independent of the other. Thus, demodulation based on the sum of the signals is much more reliable.

However, there are disadvantages in the existing system. By employing the macro-diversity mode, more resources of the base station are utilized. In addition, a high percentage of calls take place in the macro-diversity mode. Therefore, by the use of the macro-diversity technique, there is a greater likelihood of overloading the radio telecommunications network. Although the CDMA system using the macro-diversity mode provides for a clearer reception of radio telecommunication signals, a large amount of network resources is utilized. There may arise a situation where services are needed for additional users in a fully loaded system, and where the high quality provided by the macro-diversity mode may not be necessary to maintain. At present, there is no method for dynamically increasing the capacity of a fully loaded macro-diversity radio telecommunication network.

Although there are no known prior art teachings of a solution to the aforementioned deficiency and shortcoming such as that disclosed herein, prior art references that discusses subject matter that bears some relation to matters discussed herein are U.S. Pat. No. 5,109,390 to Gilhousen et al. (Gilhousen '390), U.S. Pat. No. 5,265,119 to Gilhousen et al. (Gilhousen '119), and International Publication Number WO 95/35637 (Publication '637).

Gilhousen '390 discloses a spread spectrum receiver subsystem in a CDMA cellular telephone having a searcher receiver for scanning the time domain so as to use processing gain and time discrimination properties of spread spectrum coding to determine the location in the time domain and the received signal strength of multiple receptions of a pilot signal traveling upon one or more physical propagation paths to reception. The searcher receiver provides a control signal for acquiring and demodulating a spread spectrum communication signal. Thus, Gilhousen '390 describes a CDMA receiver with a flexible capability in the time domain. However, Gilhousen '390 does not teach or suggest a method or system for increasing the capacity of a CDMA system operating in the macro-diversity mode.

Gilhousen '119 discloses a power control system for a cellular mobile telephone system in which system users communicate information signals between one another via at least one cell site using CDMA communication signals. The power control system controls transmission signal power for each cellular mobile telephone in which each cellular mobile telephone has an antenna, transmitter and receiver and each cell-site has an antenna, transmitter and receiver. The signal power transmitted from a cell-site is measured at the mobile unit. Transmitter power is adjusted at the mobile unit by decreasing or increasing the received signal power in a manner opposite to the transmitter's power strength. A command signal is generated at the cellsite and transmitted to the mobile unit for further adjusting of the mobile unit transmitter's power corresponding to deviations in the cell site's received signal power. The feedback scheme is used to further adjust the mobile unit transmitter power so that the mobile unit's transmitted signals arrive at the cell-site at a desired power level. In a cell diversity situation, the mobile unit's transmitter power is adjusted to prevent unnecessary increases in mobile unit transmitter power level. Thus, Gilhousen '119 describes a method and apparatus for controlling transmission power in a CDMA cellular mobile telephone system. However, Gilhousen '119 does not teach or suggest a system or method for increasing the capacity of a loaded CDMA system in the macro-diversity mode.

Publication '637 discloses a method in a CDMA cellular radio network having in each cell at least one base station, which communicates on a specified traffic channel, with mobile stations in its area. The signal of the users is divided into bursts in the time domain. To achieve high traffic capacity along with high-quality connections, the base station monitors the load state of the traffic channel, and transmits the information about the load state of the traffic channel to the mobile stations. The number of bursts transmitted between the mobile stations and the base stations per time unit is controlled on the basis of the delay state of the bursts and the load state information computed at the base. Thus, Publication '637 describes a method of regulating the communications load on each channel in a CDMA network using a burst control signal. However, Publication '637 does not teach or suggest a system or method to increase the capacity of a CDMA system by dynamically changing the parameters affecting the macro-diversity mode.

A method and system is needed that dynamically increases the capacity of a CDMA system in the macro-diversity mode, without disrupting any ongoing calls. It would be a distinct advantage to have a system and method for accommodating additional mobile stations in a CDMA radio telecommunications network. It is an object of the present invention to provide such a system and method.

SUMMARY OF THE INVENTION

In one aspect, the present invention is a method of dynamically increasing capacity of a code division multiple access (CDMA) radio telecommunications network. The radio telecommunications network has a plurality of base stations serving a plurality of operating mobile stations on a plurality of channel elements (transceivers). Additionally, the radio telecommunications network utilizes a macro-diversity technique to provide duplicate or triplicate channel elements to each operating mobile station. The method first starts with the radio telecommunications network receiving a request for access from an additional mobile station. Next, a load capacity monitor determines whether the radio telecommunications network is fully loaded. Then, the radio telecommunications network releases one of the duplicate channel elements from one of the operating mobile stations, upon determining that the radio telecommunications network is fully loaded. The radio telecommunications network then assigns the released channel element to the additional mobile station.

In another aspect, the present invention is a method of dynamically increasing capacity of a code division multiple access (CDMA) radio telecommunications network. The radio telecommunications network has a plurality of base stations serving a plurality of operating mobile stations on a plurality of channel elements. Additionally, the radio telecommunications network utilizes a macro-diversity technique to provide duplicate or triplicate channel elements to each operating mobile station. The method starts with a load capacity monitor determining whether the radio telecommunications network is fully loaded. The radio telecommunications network then releases one of the duplicate channel elements from one of the operating mobile station (in the macro-diversity mode or during a soft handoff), upon the load capacity monitor determining that the telecommunications network is fully loaded.

In still another aspect, the present invention is a system for dynamically increasing capacity of a code division multiple access (CDMA) radio telecommunications network having a plurality of base stations serving a plurality of operating mobile stations on a plurality of voice channels. The radio telecommunications network utilizes a macro-diversity technique to provide duplicate channel elements to each operating mobile station. The system comprises means for determining whether the radio telecommunications network is fully loaded. Additionally, the system includes means for releasing one of the duplicate channel elements from one of the operating mobile stations when the radio telecommunications network is fully loaded.

BRIEF DESCRIPTION OF THE DRAWINGS

The invention will be better understood and its numerous objects and advantages will become more apparent to those skilled in the art by reference to the following drawings, in conjunction with the accompanying specification, in which.

DETAILED DESCRIPTION OF EMBODIMENTS

The present invention is a system and method in a radio telecommunications network for dynamically increasing the capacity of a loaded CDMA radio telecommunications network in the macro-diversity mode.

Figure 1:
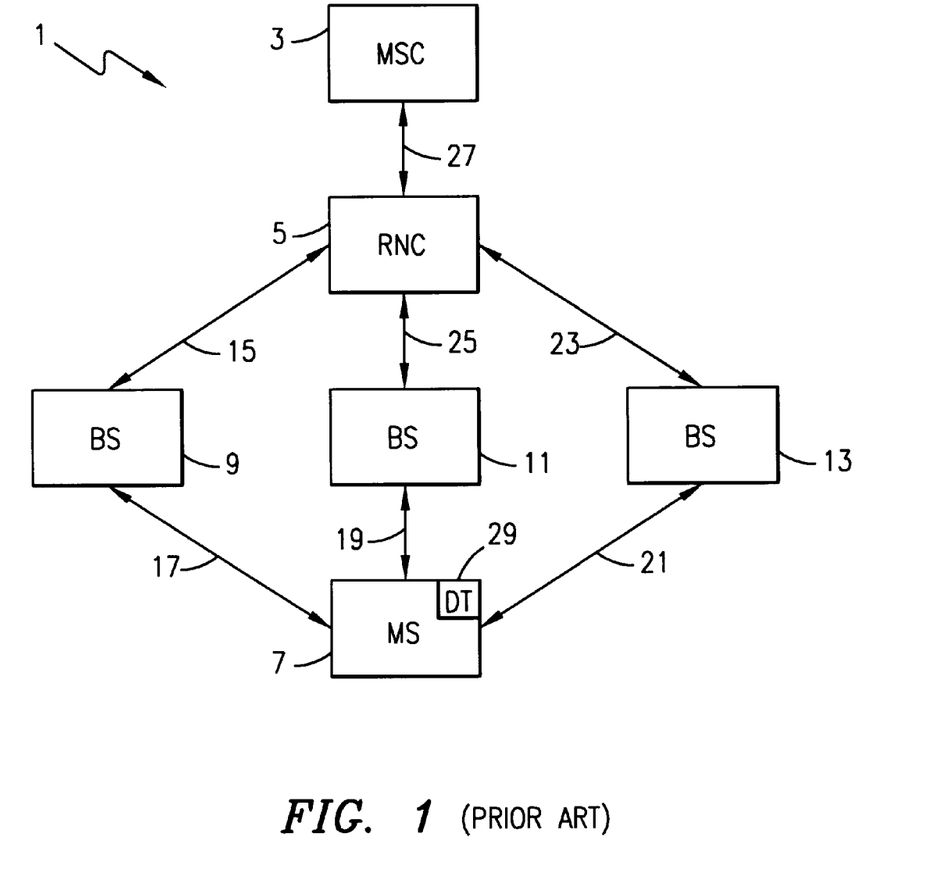
FIG. 1 (Prior Art) is a simplified block diagram illustrating the components of an existing radio telecommunications CDMA network utilizing the macro-diversity mode.

FIG. 1 is a simplified block diagram illustrating the components of an existing radio telecommunications CDMA network utilizing the macro-diversity mode. The radio telecommunication network 1 includes a mobile switching center (MSC) 3, a radio network controller (RNC) 5, a mobile station (MS) 7, a base station (BS) 9, a BS 11, a BS 13, and communications links 15–27. The MSC 3 is a switching center providing all the necessary switching functions in the existing radio telecommunications network 1. The MS 7 roams through the coverage area of the MSC 3. The MS 7 communicates within the radio telecommunications network 1 through the MSC 3 via one of the BSs (three are shown in FIG. 1). The RNC 5 controls the radio telecommunications network 1. The RNC 5 may either be co-located with the MSC 3 or remotely located away from the MSC 3. The RNC 5 maintains control of the flow of data by receiving the data on a frame by frame basis for both the uplink and the downlink.

In the existing radio telecommunications network 1, the RNC 5 and the MSC 3 interface and provide system control to the base stations. The RNC 5 may be connected to the MSC 3 by various means such as dedicated landlines, optical fiber links or by microwave communication links. The BSs 9, 11, and 13 are exemplary of the base stations found in a radio telecommunications network 1. The base stations cover a specific service area or cell designed in geographic shapes such that the MS 7 will normally be closest to one of the base stations.

Each base station transmits a pilot signal to the MS 7 via the respective communications link 17, 19, or 21. The MS 7 searches for pilot signals on the current CDMA frequency assignment to detect the presence of CDMA channels and to measure their strengths. When the MS 7 detects a pilot signal of sufficient strength that is not associated with any of the forward traffic channels assigned to it, the MS 7 sends a pilot strength measurement message to the BS transmitting the pilot signal. The BS then assigns a channel element (transceiver) associated with that pilot signal to the mobile station which then connects on this additional channel element. When the mobile station is assigned channel elements from more than one base station, it is said to be in the macro-diversity mode. For example, the MS 7 receives pilot signals from BS 9, BS 11 and BS 13 via communications links 17, 19, and 21, respectively. In a CDMA system not utilizing the macro-diversity, the MS 7 would scan and lock onto the base station with the strongest pilot signal.

However, when the CDMA system uses the macro-diversity mode, the CDMA system will employ the simultaneous use of two or more base stations enabling a greater clarity in the call. In the example where the CDMA system uses the macro-diversity mode, the MS 7 uses the base stations with pilot signals meeting or exceeding a certain predetermined threshold for signal strength.

In order to facilitate the processing of the search for pilot signals, four sets of pilot signals are defined. First, an active set defines the base station(s) through which the MS 7 is currently communicating. Second, a candidate set identifies the base station(s) in which the pilot signals have been received at the MS 7 with sufficient signal strength to make the base stations members of the active set, but have not been placed in the active set by the base station(s). Third, a neighbor set defines the base station(s) which are likely candidates for the establishment of communication with the MS 7 and are above the predetermined signal strength threshold. Finally, a fourth (remaining) set identifies the base station(s) having all other possible pilot signals, excluding the pilot signals in the neighbor set, the candidate set and the active set.

All the base stations connected to MS 7 during a call define the active set of MS 7. The MS 7 continually evaluates and updates the active set based on the pilot signal strength measurements. The strongest pilot signals are detected and measured by the MS 7. The signal strength values are then collected into a measurement report which is sent to the RNC 5. A soft handoff process in the radio telecommunications network 1 in the macro-diversity mode occurs when the MS 7 determines that a neighboring base station (within the candidate set) is transmitting a pilot signal of sufficient signal strength to meet the signal strength threshold for adding a base station to the active set.

Upon determining that the minimum signal strength threshold value is exceeded, the MS 7 transmits the measurement message to the current serving base station, for example BS 9 via communications link 17. The BS 9 relays this information to the RNC 5 via communications link 15. The RNC 5 determines whether the base station from the candidate set (in this example, BS 11) transmits a pilot signal of sufficient strength to fall within the active set window. The active set window is the range of signal strengths between the strongest and the weakest pilot signals in the active set. This range is a parameter set in the RNC 5. If the difference between the signal strength of the new signal from BS 11 and the strongest pilot signal is greater than the range allowed, the BS 11 is not added to the active set. If the BS 11's signal strength is within the active set window, and above the signal strength minimum threshold, the new base station (BS 11) is added, provided there is an available correlator in the BS and MS receivers.

If no correlator is available (i.e., the active set is full), the BS with the weakest signal strength in the active set is replaced by the new BS, if the new signal strength is higher than the signal strength from the weakest BS. For example, if a third base station's (for example, BS 13) pilot signal becomes stronger than one of the original two base stations, BS 9 and BS 11, a message indicating the strength of the pilot signal from BS 13 is sent to the RNC 5, through either BS 9 or BS 11. At this time, the BS 13 is in the candidate set. The RNC 5 may then discontinue the use of the weaker signal of one of the base stations, BS 9 or BS 11, and replace the signal with the stronger connection present in BS 13. Additionally, if the MS 7 is capable of receiving more than two base stations' signals, more base stations may be employed in the macro-diversity mode. The number of base stations utilized in the call is defined as the active set size and is limited by the number of parallel correlators the MS 7 utilizes.

In addition, the radio telecommunications network 1 employs several threshold values to determine and properly operate a handoff from one base station to another. Whenever the strength of a pilot signal becomes less than T_DROP (pilot drop threshold in a IS-95 system), the MS 7 starts a drop timer (DT) 29 located within each mobile station. The drop timer value is called T_TDROP (drop timer value in a IS-95 system). If the signal strength is still below T-DROP when the drop timer 29 expires, the base station is released from the active set. IS-95 is the standard for CDMA systems which is hereby incorporated by reference herein. The MS 7 maintains a T_TDROP for each pilot in the active set and the candidate set. The MS 7 indicates the status of the drop timer in the measurement message. If T_TDROP expires for a pilot signal from a base station found in the candidate set, the MS 7 removes the pilot signal from the candidate set.

Figure 2:
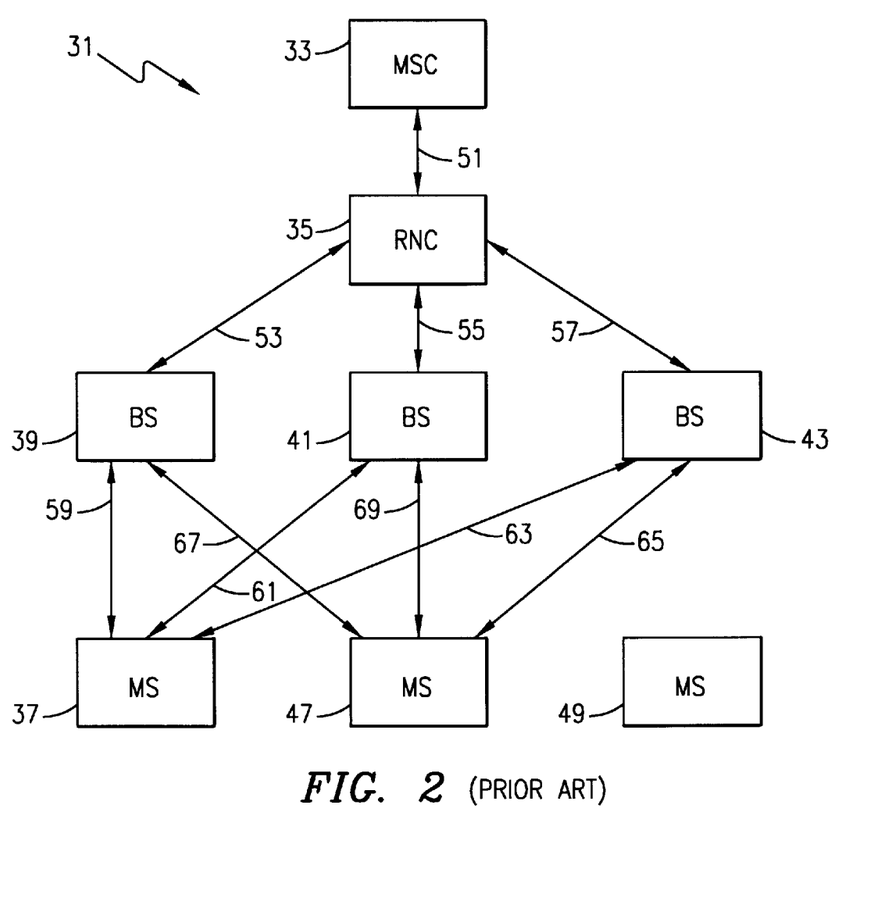
FIG. 2 (Prior Art) is a simplified block diagram of a CDMA radio telecommunications network in the macro-diversity mode in a fully loaded capacity.

However, the use of multiple base stations is limited by the resources available within the base stations. FIG. 2 is a simplified block diagram of a CDMA radio telecommunications network 31 in the macro-diversity mode in a fully loaded capacity. The radio telecommunications network 31 includes a MSC 33, an RNC 35, a BS 39, a BS 41, a BS 43, a MS 37, a MS 47, a MS 49, and communications links 51–67. The base stations have a finite number of transceivers for communications with a plurality of mobile stations. Therefore, when the resources of a particular base station are utilized completely, no further mobile stations may utilize that base station's resources in the existing system without releasing another call. For simplicity of illustration, in the example depicted in FIG. 2, the BSs 39, 41, and 43 are each capable of transmitting and receiving signals to two different mobile stations. Of course, in actual practice, this number would be much greater. The MS 37 is utilizing three base stations, BS 39, 41, and 43 in the active set window. Additionally, MS 47 is utilizing three base stations, BS 39, 41, and 43 in the active set window. In this configuration, the CDMA system is fully loaded and will not allow any additional mobile stations to operate. Therefore, MS 49 cannot use the radio telecommunications network 31.

Figure 3:
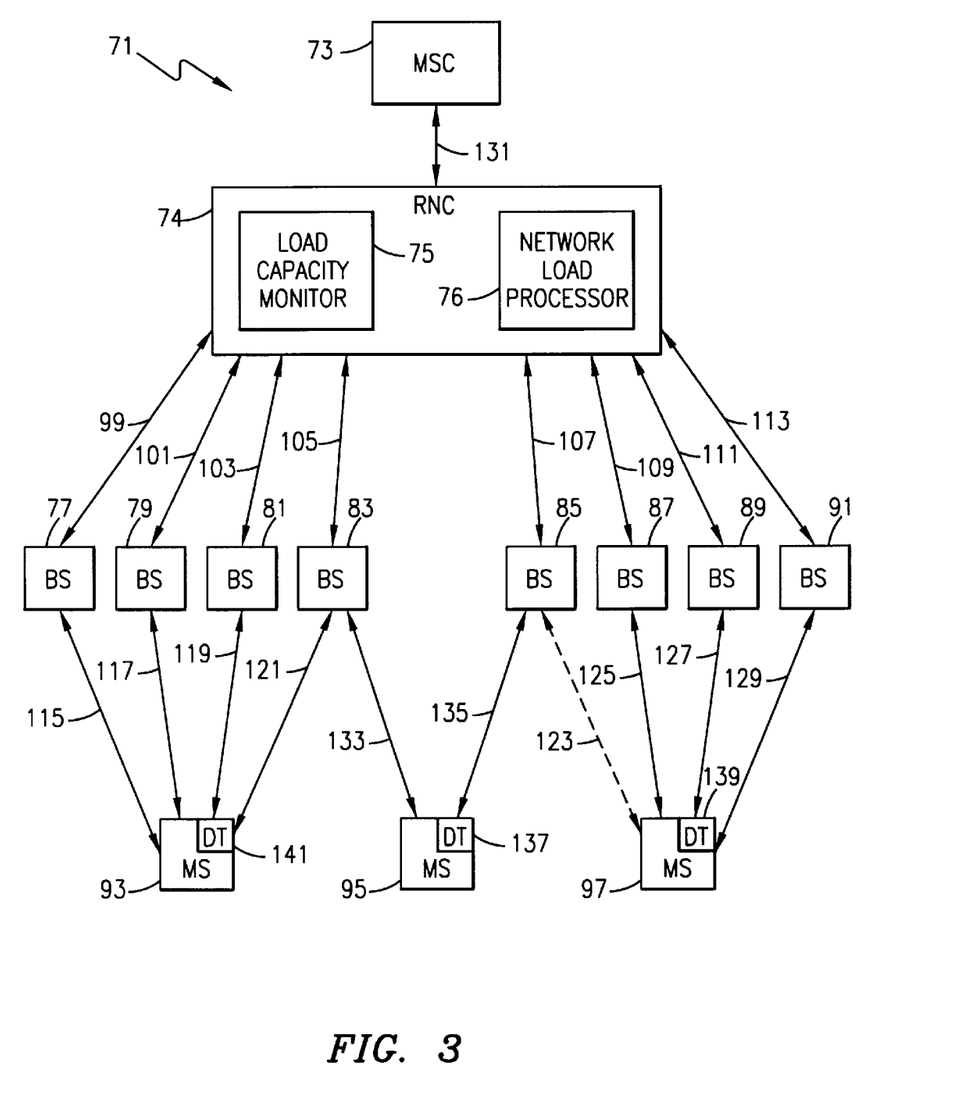
FIG. 3 is a simplified block diagram of a CDMA radio telecommunications network with a dynamically increasing capacity according to the teachings of the present invention.

FIG. 3 is a simplified block diagram of a CDMA radio telecommunications network 71 with a dynamically increasing capacity according to the teachings of the present invention. The radio telecommunications network 71 includes a MSC 73, and a RNC 74 having a load capacity monitor 75 and a network load processor 76. The radio telecommunications network also includes BSs 77–91, a MS 93, a MS 95, a MS 97, and communications links 99–135.

The MSC 73 is a switching center providing all the necessary switching functions in the existing radio telecommunications network 71. The MSs 93–97 roam through the coverage area of the MSC 73. In addition, the MSs 93–97 each utilize a drop timer (DTs 137–141) located within each mobile station. The MSs 93–97 communicate within the radio telecommunications network 71 through the MSC 73. The use of eight base stations and three mobile stations is exemplary only. The radio telecommunications network 71 may have a greater or lessor number of base stations and mobile stations operating within the radio telecommunications network 71.

The RNC 74 controls the radio telecommunications network 71. The RNC 74 may either be co-located with the MSC 73 or remotely located away from the MSC 73. In the example depicted in FIG. 3, the RNC 74 is located away from the MSC 73. The RNC 74 maintains control of the flow of data by receiving the data on a frame by frame basis for both the uplink and the downlink. The RNC 74 controls which base stations provide coverage for each mobile station using the radio telecommunications network 71. The RNC 74 can monitor the load of users in the radio telecommunications network 71, through the load capacity monitor 75, preferably located within the RNC 74. In other embodiments of the present invention, the load capacity monitor 75 may be located anywhere within the radio telecommunications network 71. Additionally, the RNC 74 can change the parameters associated with the use of the base station resources in the radio telecommunications network 71, through the network load processor 76, preferably located within the RNC 74. However, in alternate embodiments of the present invention, the network load processor 76 may be located at any location within the radio telecommunications network 71.

In the radio telecommunications network 71, the RNC 74 and the MSC 73 interface and provide system control to the base stations. The RNC 74 may be connected to the MSC 73 by various means such as dedicated landlines, optical fiber links or by microwave communication links. The base stations cover a specific service area or cell such that, in this example, the MS 93 is closest to the group of BSs 77, 79, 81, and 83. Likewise MS 97 is closest to the group of BSs 85–91 Each base station transmits a pilot signal to the respective MS. The pilot signals are transmitted to the MS 93 and MS 97 from the respective base stations via communications links 115–129.

In this example, MS 93 has four base stations in its active set, BSs 77–83. MS 97 also has four base stations in its active set, BSs 85–91. For simplicity of illustration, each base station only has one channel element. However, in practice each base station would have more than one channel element. In this configuration, the MS 95 cannot utilize any base stations since the radio telecommunications network is at a fully loaded capacity. The load capacity monitor 75 constantly monitors the load on the capacity of the radio telecommunications network 71. When the RNC 74 recognizes that the radio telecommunications network is at full capacity, the network load processor 76 changes the parameters associated with the allocation of the base station resources in order to accommodate additional mobile stations. In one embodiment, the network load processor 76 modifies the parameters for all of the base station resources in the entire radio telecommunications network 71. Alternately, in another embodiment of the present invention, the network load processor 76 modifies the parameters for only base stations serving the entering mobile station (i.e. the candidate set of MS 95) and leaves the parameters affecting other base stations and their served mobile stations alone.

There are various parameters the network load processor 76 can modify to affect the allocation of base stations to mobile stations. One such parameter the network load processor 76 can change is the size of the active set window. By changing the size of the active set window (i.e., the allowable range of signal strength), the size of the active set (i.e., the number of base stations in the active set) may be modified. Currently, in this example, the size of the active set is four base stations. The network load processor 76 can reduce the size of the active set window by changing threshold values (e.g., T_ADD and T_DROP in IS-95). By reducing the size of the active set window, the number of base stations having signal strengths within this reduced range may be decreased. If the size of the active set window is decreased, the allowable range of signal strength (the difference between the strongest signal strength and the weakest signal strength) is reduced. By decreasing the size of the active set window, the base stations with signal strengths not within the active set window will be discarded from the active set. The network load processor 76 transmits the new size of the active set window to the specified base stations in the radio telecommunications network 71. Alternately, the network load processor 76 changes the size of the active set window for only specific base stations within the candidate set of the entering MS 95, while keeping the size of the active set window for current users the same. In either case, the network load processor 76 transmits the modified size of the active set window to the specified base stations and the associated served mobile stations.

In FIG. 3, the network load processor 76 transmits the modified active window set to the specified BSs 77–91 via communications links 99–113. The BSs 77–83 transmit this information to the MS 93 via communications links 115–121. Likewise, the BSs 85–91 transmits the modified size of the active set window to the MS 97 via communications links 123–129.

By reducing the size of the active set window, fewer base station resources are needed for the current mobile stations of the radio telecommunications network 71 because some of the weaker links are terminated. Thus, reducing the size of the active set window may reduce the active set from, for example, four base stations to three. For example, BS 83's link 121 with MS 93 could be terminated since only three base stations can be used in the active set. Likewise, BS 85's link 123 with MS 97 could be terminated. This would allow MS 95 to utilize the radio telecommunications network 71 through BS 83 or BS 85, via communications links 133 or 135. In another example, the MS 95 utilizes both base stations, BS 83 and BS 85, in the macro-diversity mode.

Another way the network load processor 76 can increase the capacity of the radio telecommunications network 71 is to change the drop threshold values. For example, in IS-95, by increasing T_DROP, the number of base stations in the active set can be reduced. T_DROP is the pilot signal threshold value necessary for a base station to remain within the active set. If the base station's pilot signal falls below T_DROP, the base station is removed from the active set.

In addition, the network load processor 76 can reduce the base station resources in the active set by reducing the drop timer value for each drop timer (DTs 137–141) located within each mobile station. For example, in IS-95, the T_TDROP parameter can be reduced. T_TDROP determines how long the system waits before the base station is released from the active set after the pilot signal falls below the drop threshold, e.g. T_DROP. By reducing the drop timer value, base stations are more likely to be dropped from the active set due to temporary fluctuations in signal strength.

Figure 4A:
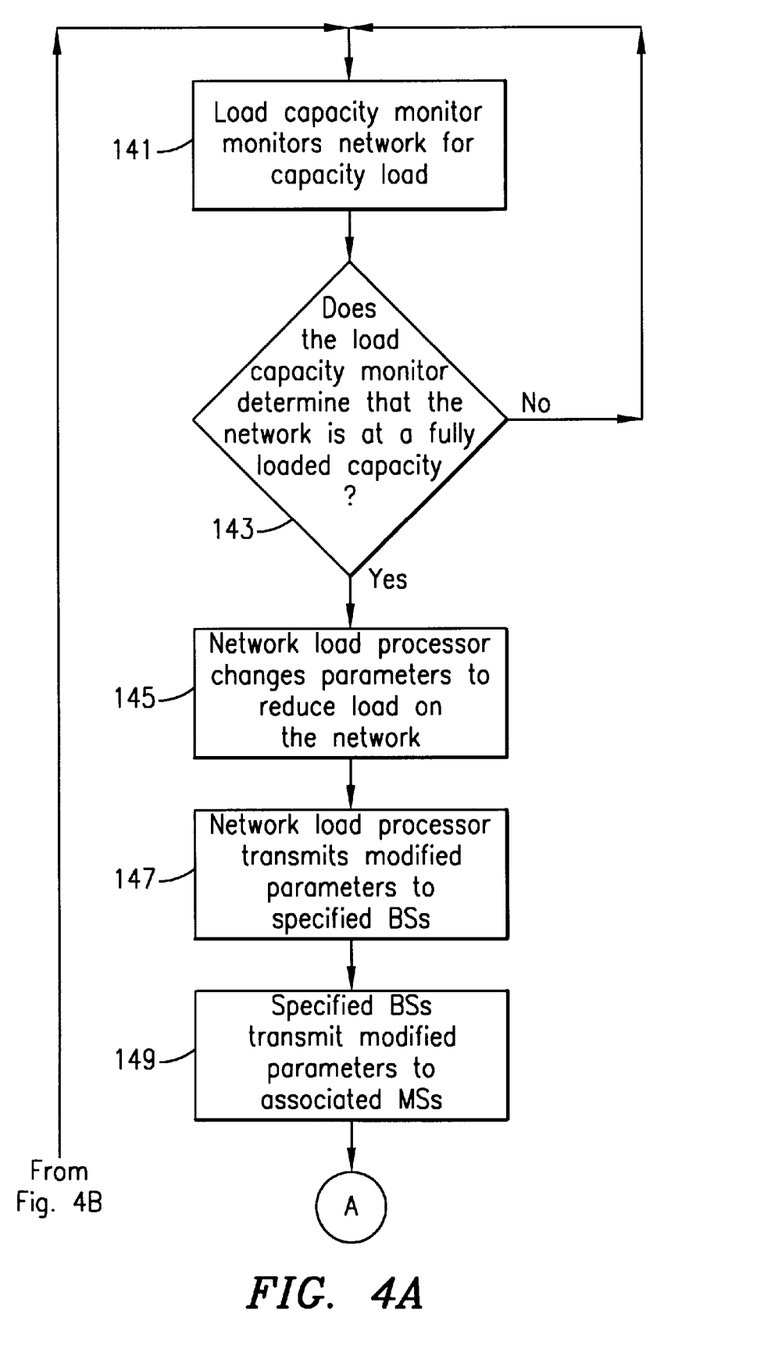
FIGS. 4A and 4B are flow charts outlining the steps of a method for increasing the capacity of a fully loaded CDMA radio telecommunications network in the macro-diversity mode according to the teachings of the present invention.
Figure 4B:
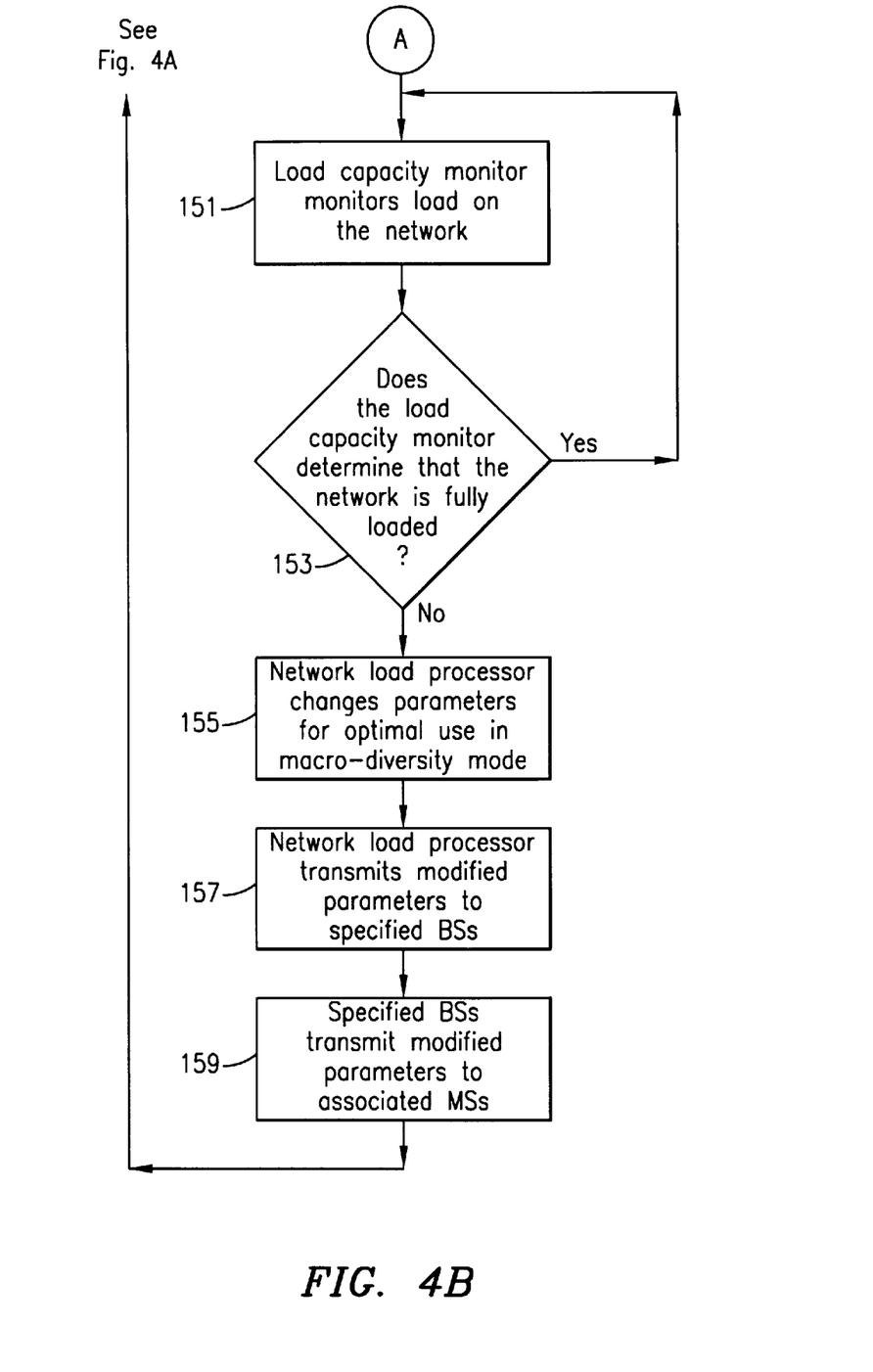

FIGS. 4A and 4B are flow charts outlining the steps of a method for increasing the capacity of a fully loaded CDMA radio telecommunications network in the macro-diversity mode. With reference to FIGS. 3, 4A, and 4B, the steps of the method will now be described. Beginning with step 141, the load capacity monitor 75 monitors the radio telecommunications network 71 for the capacity load on the base stations, BSs 77–91. Next, in step 143, it is determined whether or not the load capacity monitor 75 recognizes that the radio telecommunications network 71 is at a loaded capacity. The loaded capacity may be defined by the mobile network operator at whatever level the operator desires. For example, the loaded capacity may be defined as a condition in which no additional mobile stations can communicate on the radio telecommunications network 71, or at a point prior to total saturation.

If the load capacity monitor 75 determines that the radio telecommunications network 71 is not at a loaded capacity, the method moves back to step 141, where the load capacity monitor continues to monitor for the capacity load in the radio telecommunications network 71. If, however, the load capacity monitor 75 determines that the radio telecommunications network 71 is at a fully loaded capacity, the method moves from step 143 to step 145, where the network load processor 76, changes the parameters associated with the allocation of base station resources in order to increase the capacity of the radio telecommunications network 71. The network load processor 76 may change the parameters for all base stations and their associated served mobile stations in the telecommunications network 71, or alternately, the network load processor 76 may modify specific base stations and their associated served mobile stations. For example, the network load processor 76 may change only those base stations needed to serve the entering MS 95 (BSs within the candidate set for MS 95). One parameter which the network load processor 76 may change is the size of the active set window. The network load processor 76 can reduce the size of the active set window, and in doing so, may reduce the amount of base stations in the active set. Alternately, the network load processor 76 can change the size of the active set window for new entering mobile stations, while maintaining the current active set window for currently operating mobile stations. By reducing the size of the active set window, a reduced number of base stations may be utilized by the currently operating mobile stations in the radio telecommunications network 71. When the size of the active set window is reduced, base stations with signal strength not within the active set window are dropped from the active set. This frees up base stations, enabling additional mobile stations to utilize the radio telecommunications network 71.

Another way the network load processor 76 can increase the capacity of the radio telecommunications network 71 is to change the drop threshold values. For example, in a IS-95 system, by increasing T_DROP, the number of base stations in the active set can be reduced. T_DROP is the pilot signal threshold level necessary for a base station to be included in the active set. If the base station's pilot signal falls below T_DROP, the base station is removed from the active set. In addition, the network load processor 76 can reduce the base station resources in the active set by reducing the drop timer value. For example, in a IS-95 system, the T_TDROP parameter can be reduced. T_TDROP determines the time period that the system waits before the base station is released from the active set after the pilot signal falls below the drop threshold, i.e., T_DROP. By reducing the drop timer value, base stations are more likely to be dropped from the active set due to temporary fluctuations in signal strength.

After the network load processor 76 changes the parameters in step 145, the method moves to step 147, where the RNC 74 transmits the modified parameters to the specified base stations. Next, in step 149, the modified parameters are transmitted from the specified base stations to the associated mobile stations using the radio telecommunications network 71. Next, in step 151, the load capacity monitor 75 continues to monitor the capacity load on the radio telecommunications network 71. In step 153, it is determined whether or not the load capacity monitor 75 recognizes that the radio telecommunications network 71 is in a loaded capacity. If the load capacity monitor 75 determines that the radio telecommunications network 71 is still in a loaded capacity, the method moves back to step 151, where the load capacity monitor 75 continues to monitor the load on the radio telecommunications network.

If however, the load capacity monitor 75 determines that the radio telecommunications network 71 is no longer in a loaded capacity, the method moves from step 153 to step 155, where the network load processor 76 changes the parameters associated with base station resources back to the original condition allowing optimal use in the macro-diversity mode. Next, in step 157, the network load processor 76 transmits the modified parameters to the base stations in the radio telecommunications network 71. Then, in step 159, the affected base stations, upon receipt of the modified parameters, transmits the modified parameters to the base stations' associated mobile stations. The method then moves back to step 141, where the load capacity monitor 75 monitors the radio telecommunications network 71 for capacity load and the process begins again.

It is thus believed that the operation and construction of the present invention will be apparent from the foregoing description. While the method and system shown and described have been characterized as being preferred, it will be readily apparent that various changes and modifications could be made therein without departing from the spirit and scope of the invention as defined in the following claims.

What is claimed is:

1. A method of dynamically increasing capacity of a fully loaded code division multiple access (CDMA) radio telecommunications network having a plurality of base stations serving a plurality of operating mobile stations on a plurality of channel elements, said radio telecommunications network utilizing a macro-diversity technique to improve radio quality between the base stations and each operating mobile station, said method comprising the steps of:

simultaneously providing a plurality of duplicate radio channel elements from at least one base station to each mobile station operating in the radio telecommunications network;

receiving a request for access to said fully loaded radio telecommunications network from an additional mobile station;

determining, by a load capacity monitor, whether said radio telecommunications network is fully loaded;

releasing one of said duplicate channel elements from one of said operating mobile stations, upon determining that said radio telecommunications network is fully loaded; and     assigning said released channel element to said additional mobile station.

2. The method of claim 1 wherein said step of releasing one of said duplicate channel elements includes:

modifying, by a network load processor, a parameter affecting allocation of said plurality of base stations serving said plurality of operating mobile stations from an original value in order to reduce use of said plurality of base stations by said plurality of operating mobile stations; and     transmitting, by said network load processor, said modified parameter to said plurality of base stations.

3. The method of claim 2 further comprising, after the step of transmitting, by said network load processor, said modified parameter, the step of transmitting, by said plurality of base stations, said modified parameter to said plurality of operating mobile stations.

4. The method of claim 3 further comprising, after the step of transmitting said modified parameter to said plurality of operating mobile stations, the steps of:

determining, by said load capacity monitor, whether said radio telecommunications network is fully loaded;

modifying, by said network load processor, said modified parameter to said original value upon said load capacity monitor determining that said radio telecommunications network is fully loaded;

transmitting, by said network load processor, said modified parameter to said plurality of base stations; and transmitting, by said plurality of base stations, said modified parameter to said plurality of operating mobile stations.

5. The method of claim 3 wherein said step of modifying, by a network load processor, a parameter affecting allocation of said plurality of base stations includes reducing a size of an active set window for said plurality of base stations.

6. The method of claim 3 wherein said step of modifying, by a network load processor, a parameter affecting allocation of said plurality of base stations includes modifying a set of drop threshold values necessary for a base station to remain within an active set window.

7. The method of claim 3 wherein said step of modifying, by a network load processor, a parameter affecting allocation of said plurality of base stations includes modifying a drop timer value for said plurality of operating mobile stations.

8. A method of dynamically increasing capacity of a fully loaded code division multiple access (CDMA) radio telecommunications network having a plurality of base stations serving a plurality of operating mobile stations on a plurality of channel elements, said radio telecommunications network utilizing a macro-diversity technique to improve radio quality between the base stations and each operating mobile station, said method comprising the steps of:

simultaneously providing a plurality of duplicate radio channel elements from at least one base station to each mobile station operating in the radio telecommunications network;

determining, by a load capacity monitor, whether said radio telecommunications network is fully loaded; and releasing one of said duplicate channel elements from one of said operating mobile stations, upon determining, by said load capacity monitor, that said telecommunications network is fully loaded.

9. The method of claim 8 wherein said step of releasing one of said duplicate channel elements includes:

modifying, by a network load processor, a parameter affecting allocation of said plurality of base stations serving said plurality of operating mobile stations from an original value in order to reduce use of said plurality of base stations by said plurality of operating mobile stations; and transmitting, by said network load processor, said modified parameter to said plurality of base stations.

10. The method of claim 9 further comprising, after the step of transmitting, by said network load processor, said modified parameter, the step of transmitting, by said plurality of base stations, said modified parameter to said plurality of operating mobile stations.

11. The method of claim 10 further comprising, after the step of transmitting said modified parameter to said plurality of operating mobile stations, the steps of:

determining, by said load capacity monitor, whether said radio telecommunications network is fully loaded;

modifying, by said network load processor, said modified parameter to said original value upon said load capacity monitor determining that said radio telecommunications network is fully loaded;

transmitting, by said network load processor, said modified parameter to said plurality of base stations; and transmitting, by said plurality of base stations, said modified parameter to said plurality of operating mobile stations.

12. The method of claim 10 wherein said step of modifying, by a network load processor, a parameter affecting allocation of said plurality of base stations includes reducing a size of an active set window for said plurality of base stations.

13. The method of claim 10 wherein said step of modifying, by a network load processor, a parameter affecting allocation of said plurality of base stations includes modifying a set of drop threshold values necessary for a base station to remain within an active set window.

14. The method of claim 10 wherein said step of modifying, by a network load processor, a parameter affecting allocation of said plurality of base stations includes modifying a drop timer value for said plurality of operating mobile stations.

15. The method of claim 10 further comprising, after the step of releasing one of said duplicate channel elements from one of said operating mobile station, the step of assigning said released channel element to an entering mobile station.

16. A system for dynamically increasing capacity of a fully loaded code division multiple access (CDMA) radio telecommunications network having a plurality of base stations serving a plurality of operating mobile stations on a plurality of channel elements, said radio telecommunications network utilizing a macro-diversity technique to improve radio quality between the base stations and each operating mobile station, said system comprising:

means for simultaneously providing a plurality of duplicate radio channel elements from at least one base station to each mobile station operating in the radio telecommunications network;

means for determining whether said radio telecommunications network is fully loaded; and means for releasing one of said duplicate channel elements from one of said operating mobile stations when said radio telecommunications network is fully loaded.

17. The system of claim 16 wherein said means for releasing one of said duplicate channel elements includes:

means for modifying a parameter affecting allocation of said plurality of base stations serving said plurality of operating mobile stations in order to reduce use of said plurality of base stations by said plurality of operating mobile stations; and means for transmitting said modified parameter to said plurality of base stations.

18. The system of claim 17 further comprising means for transmitting said modified parameter from said plurality of base stations to said plurality of operating mobile stations.

19. The system of claim 16 further comprising means for receiving a request for access to said radio telecommunications network from an additional mobile station.

20. The system of claim 19 further comprising means for assigning said released channel element to said additional mobile station.

* * * * *